United States Patent [19]

Okada

[11] Patent Number: 4,465,730

[45] Date of Patent: Aug. 14, 1984

[54] LEATHER-LIKE TEXTILE MATERIAL

[75] Inventor: Hozuma Okada, Kyoto, Japan

[73] Assignee: Sakashita Co., Ltd., Kyoto, Japan

[21] Appl. No.: 490,411

[22] Filed: May 2, 1983

[30] Foreign Application Priority Data

May 6, 1982 [JP] Japan ............................ 57-66424[U]

[51] Int. Cl.³ .............................................. B32B 7/00
[52] U.S. Cl. ................................... 428/246; 428/248;
428/252; 428/253; 428/904; 428/913
[58] Field of Search ............... 428/904, 253, 245, 246,
428/252, 913, 248

[56] References Cited

U.S. PATENT DOCUMENTS

| | | | |
|---|---|---|---|
| 3,362,862 | 1/1968 | Wing | 428/253 |
| 3,486,968 | 12/1969 | Mater | 428/246 |
| 3,496,042 | 2/1970 | Wyness | 428/253 |
| 3,563,842 | 2/1971 | Thomas | 428/246 |
| 4,141,082 | 2/1979 | Nakazawa | 428/253 |

FOREIGN PATENT DOCUMENTS 2434779   3/1976   Fed. Rep. of Germany ...... 428/904

*Primary Examiner*—James J. Bell

[57] ABSTRACT

A leather-like textile material comprising a multi-layered substrate having at least first and second knitted or woven fabric layers, and a leather-like covering provided on one surface of the second fabric layer opposite to the first fabric layer. The first fabric layer is made of a material having a high water permeability, but a low water retentivity, and the second fabric layer is made of a material having a high water retentivity.

9 Claims, 2 Drawing Figures

LEATHER-LIKE TEXTILE MATERIAL

BACKGROUND OF THE INVENTION

This invention generally relates to a textile material and, more particularly, to a leather-like textile material capable of bringing about favorable effects on sweat absorbency.

Currently, numerous types of leather-like textile materials are available and, of them, a textile material consisting of a cupra fabric having one surface coated with polyurethane is known as having the highest water absorbency.

While the cupra fabric has such a high water holding capability or water retentivity as to absorb a large amount of sweat emanating from the body of a wearer, the polyurethane coating has little gas permeability or, if it has, a gas permeability short of the value required to accommodate the wearer's rate of perspiration. Therefore, it has often experienced that the cupra fabric absorbing a relatively large amount of sweat, once it contacts the skin of the wearer's body, wets the wearer's body to such an extent as to cause the wearer to feel uncomfortable.

On the other hand, a leather is known as having an excellent gas permeability and is, therefore, advantageous in that moisture originating mainly from the sweat can be expelled to the exterior of the wearer's body. However, even the leather poses a problem in that it allows moisture exterior of the wearer to permeate the wearer's body.

SUMMARY OF THE INVENTION

Accordingly, this invention has been developed to overcome the above described disadvantages and inconveniences and has for its essential object to provide an improved leather-like textile material of a structure wherein the surface which may contact the wearer's body can be kept dry at all times and will not therefore be stuffy.

According to this invention, the above described object can be accomplished by providing an improved leather-like textile material which comprises a double-layered substrate of textile fabric having first and second fabric layers and a leather-like covering provided on one surface of the second fabric layer opposite to the first fabric layer. The first fabric layer is prepared from a textile fabric having a high water permeability and a low water retentivity whereas the second fabric layer is from a textile fabric having a high water retentivity. Thus, the first and second fabric layers, preferably integrally knitted or woven together to form the double-layered substrate, serve as a water permeable layer and a water absorbent layer, respectively.

With this leather-like textile material, since the water permeable layer, that is, the first fabric layer, acts to avoid direct contact between the skin of the wearer's body and the second fabric layer, the surface of the textile material as a whole, which may contact the wearer's body skin, can advantageously be kept dry at all times.

BRIEF DESCRIPTION OF THE DRAWINGS

These and other objects and features of this invention will become readily understood from the following description taken in conjunction with preferred embodiments thereof with reference to the accompanying drawings, in which.

DETAILED DESCRIPTION OF THE EMBODIMENTS

Figure 1:
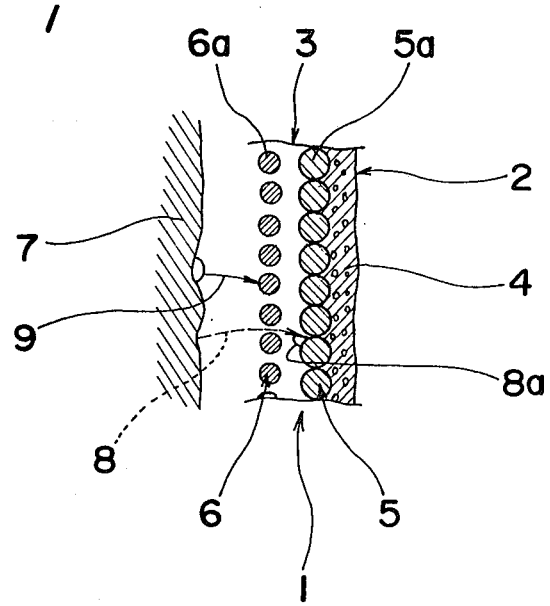
FIGS. 1 and 2 are schematic cross-sectional views, substantially on a microscopically enlarged scale, showing a leather-like textile material according to respective embodiments of this invention.

Before the description of this invention proceeds, it is to be noted that like parts are designated by like reference numerals throughout the accompanying drawings.

Referring first to FIG. 1, a leather-like textile material, generally designated by 1, comprises a leather-like covering 2 having a plurality of cells 4 therein, and a double-layered substrate 3 of textile fabric provided on one surface of the covering 2 which may face the body 7 of a wearer. The cover 2 may be a known synthetic leather composed of a knitted or woven web of textile fabric having a coated layer of synthetic resin such as polyvinyl chloride, nylon or polyurethane, a known artificial leather composed of a non-woven web of textile fibers having a coated layer of synthetic resin, for example, polyurethane, with macropores therein, or a coated fabric.

The double-layered substrate of textile fabric includes a first fabric layer 6, which serves as a water permeable layer, and a second fabric layer 5 which serves as a water absorbent layer, said second fabric layer 5 being held in contact with the covering 2 with the first fabric layer 6 positioned on one side of the second fabric layer 5 opposite to the covering 2. Preferably, the first and second fabric layers 6 and 5 are integrally knitted together by the use of a known raschel machine or a known tricot knitting machine to provide the double-layered substrate 2 of textile fabric. The types of yarns used to form the first and second fabric layers 6 and 5, respectively, may be of the same gauge or different gauge. However, where the gauge of the yarns for the first fabric layer 6 is smaller than that for the second fabric layer 5 so that the first fabric layer 6 can be rendered to have a more coarse network than the first fabric layer 6, a moisture component 8 of the sweat emanating from the wearer's body 7 can readily permeate through the first fabric layer 6. In addition, each of the first and second fabric layers 6 and 5 may be either a warp knitted fabric or a weft knitted fabric, or a woven fabric instead of the knitted fabric.

In the practice of this invention, the yarns 6a used to manufacture the first fabric layer 6 are of a kind having a high water permeability, but a low water retentivity (which means the amount of water trapped by the fabric, expressed in terms of the content of water in the fabric and which is related to the moisture absorbability and the water absorbability of the fabric), and also having a thickness smaller than that of the yarns 5a used to manufacture the second fabric layer 5. In addition the first fabric layer 6 which is adapted to contact, either directly or indirectly, the skin of the wearer's body has such a network that water component absorbed by the second fabric layer 5 through the first fabric layer 6 will not permeate in the reverse direction towards the wearer's body 7 through the first fabric layer 6, as will be discussed in more detail later.

Examples of the yarns 6a for the first fabric layer 6 include polyester (Water Retentivity: 0.6 to 0.7% at 20° C. and 95% relative humidity), nylon (Water Retentivity: 8.0 to 9.0% at 20° C. and 95% relative humidity), polypropylene, vinylidene, vinylon and others.

On the other hand, the second fabric layer 5 is manufactured by the use of the yarns 5a of a kind having a high water retentivity and a relatively large thickness and has so fine a network that moisture component 8 of the sweat which has passed through the first fabric layer 6 can be condensed and then absorbed by the second fabric layer and that, even if a certain load is applied thereto through the covering 2, the water component of the sweat soaking in the second fabric layer 5 will not penetrate in a direction towards the first fabric layer 6. It is to be noted that the second fabric layer 5 is preferred to have a thickness sufficient to absorb the sweat emanating from the wearer's body.

Examples of the yarns 5a for the second fabric layer 5 include cuprammonium rayon (Water Retentivity: 21.0 to 25.0% at 20° C. and 95% relative humidity), rayon (Water Retentivity: 25.0 to 30.0% at 20° C. and 95% relative humidity), cotton (Water Retentivity: 24.0 to 27.0% at 20° C. and 95% relative humidity), water-absorbent nylon, acrylic resin and others which can absorb the sweat emanating from the wearer's body 7.

More specifically, the thickness of the yarns for the first fabric layer 6 and the network structure thereof are so correlated and so selected that any possible direct contact of the second fabric layer 5 to the skin of the wearer's body 7 through interstices of the first fabric layer 6 will not take place and that the water permeability thereof will not be adversely affected. For this reason, the yarns 6a for the first fabric layer 6 are preferably of a type having 30 to 300 deniers and are preferably knitted in 50 vertical rows per inch in the case of the 30 denier yarn to 14 vertical rows per inch in the case of the 100 denier yarn.

On the other hand, the yarns 5a for the second fabric layer 5 are preferably of a type having 40 deniers or more.

By way of example, a polyester fabric having 34 vertical rows per inch and formed by the use of the polyester yarns of a type having 30 deniers is preferred as a material for the first fabric layer 6 while a cupra fabric having 34 vertical rows per inch and formed by the use of the cuprammonium rayon yarns of a type having 50 deniers is preferred as a material for the second fabric layer 5.

The leather-like covering 2 may be formed by depositing or coating on the double-layered substrate 3, specifically, on one side of the second fabric layer 5 opposite to the first fabric layer 6 as shown, by the use of a known wet type film forming method so as to have an closed cells. The formation of this covering 2 is carried out after the first and second fabric layers 6 and 5 have been integrated together in the manner as hereinbefore described. This covering 2 may be exposed to the outside and should, therefore, have a good-looking appearance and be durable with no substantial water permeability. For this purpose, it may be made of polyurethane, vinyl chloride, acrylic resin, rubber, amino acid or the like. Where it is made of either polyurethane or amino acid, it may have a moisture permeability. Although the covering 2 so far shown in FIG. 1 is of a foamed structure with closed cells, it may not be limited thereto and may be a moisture absorbent coating of polyvinyl chloride, acrylic coating, polyurethane or the like resin. In either case, the outer surface of the covering 2 remote from the wearer's body may be raised.

The leather-like textile material 1 of the structure described hereinbefore functions in the following manner and as shown in FIG. 1.

In general, the sweat excreted from the human body can be broadly classified into the moisture component 8 evaporated from the skin and liquid droplets 9 remaining on the skin.

The moisture component 8 can pass through the interstices of the first fabric layer 6, contacting the skin of the wearer's body 7, and is in turn absorbed by the second fabric layer 5 after having been condensed into liquid droplets 9a. On the other hand, the liquid droplets 9 are soaked into the interstices of the first fabric layer 6, which are defined between the yarns 6a and also among the fibers, and are then totally absorbed by the second fabric layer 5 to allow the surface of the first fabric layer 6 adjacent the wearer's body to be dry at all times.

As hereinabove described, vapor of the sweat within an air layer between the leather-like textile material 1 and the wearer's body 7 can be absorbed by the second fabric layer 5 through the first fabric layer 6 and, therefore, the air layer will not be saturated and no wetting of the body skin will occur. In addition, since the condensation of the moisture component 8 into the liquid components 8a takes place only in the second fabric layer 5, wet heat generated upon wetting as a result of the condensation of the moisture component 8 will not reach the wearer's body 7 which is spaced from the second fabric layer 5 by the intervention of the first fabric layer 6 and, accordingly, the wearer's body 7 can be kept dry. Moreover, in view of the intervention of the first fabric layer 6 between the second fabric layer 5 and the wearer's body 7, the heat of vaporization of the condensed liquid droplets will not substantially bring about any adverse effect.

Thus, by the cumulative effect brought about by the combination of the covering 2 having no water permeability and the double-layered substrate 3 of first and second fabric layers 6 and 5 which is integrated with the covering 2, not only will the wearer's body be free from a stuffy condition even if perspiration takes place, but also water cannot penetrate from exteriorly of the covering 2 and the wearer's body 7 can, therefore, be kept in a sanitary and warm condition. In addition, because of the positioning of the covering 2 on one side of the double-layered substrate 3 remote from the wearer's body, the leather-like textile material having a good appearance, high quality (multi-colorable, polishable and crepeable) and high durability can be manufactured at reduced cost as compared with leathers.

The leather-like textile material according to this invention can also be used as, for example, a bed sheet. In such case, the leather-like textile material is used with the covering 2 and the double-layered substrate 3 facing downwards and upward, respectively. During the use as the bed sheet, moisture emanating from the body of a sleeper lying on the double-layered substrate 3 of the leather-like textile material can be absorbed by the second fabric layer 5 and retained therein without allowing it to penetrate through the covering 2. Where the leather-like textile material is to be used as the bed sheet, the covering 2 is preferably made into a waterproof layer of rubber lining, polyvinyl chloride lining, acrylic resin lining, or polystylene foam. Moreover, a non-woven fabric, for example, may be interposed between the covering 2 and the double-layered substrate 3 so that the leather-like textile material as a whole can be imparted with both toughness and durability comparable to those of a leather.

This invention is not limited to the embodiment described with reference to and shown in FIG. 1, but may be practised in numerous ways. By way of example, the covering may have a gas permeability. This can be accomplished by, as shown in FIG. 2, making the covering 2 in such a manner that a layer 10 of covering having a plurality of regularly and continuously lined-up closed pores 11 defined therein is cut in a plane intermediately of the thickness thereof and along the line A—A shown in FIG. 2 and a portion of the layer 10 of covering left adhering to the double-layered substrate 3 is then ground to allow cavities 10a in that portion of the layer 10 to be communicated with the interstices of the second fabric layer 5.

According to the embodiment described above and shown in FIG. 2, it is clear that the moisture or water content in the second fabric layer 5 can be allowed to be expelled to the outside through the covering 2 in gaseous phase.

Figure 2:
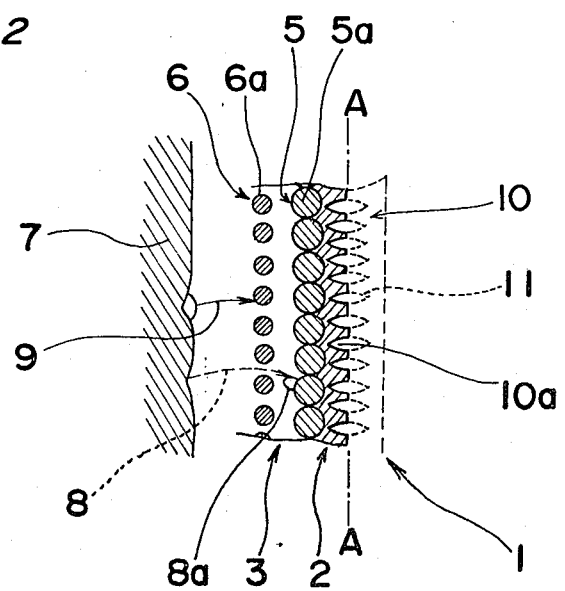

In either of the foregoing embodiments shown respectively in FIGS. 1 and 2, the first fabric layer 6 may be raised to impart to the textile material of this invention an increased warmth retentivity. Moreover, the second fabric layer 5 may be made of polyurethane elastic yarns (commercially available under the trade name, "Spandex") wound with the moisture-absorbent and water-absorbent threads 5a and, in such case, an outer lining may be provided on the outer surface of the covering 2 opposite to the double-layered substrate 3.

It is to be noted that, in the foregoing description, the leather-like textile material has been described as directly contacting the wearer's body for the purpose of facilitating a better understanding of this invention. However, even if one or more undergarments are intervened between the textile material of this invention and the wearer's body, the textile material functions in a manner similar to that described hereinbefore. That is, the moisture component of the sweat emanating from the wearer's body can reach the double-layered substrate after having passed through the undergarments or after having been temporarily absorbed by and then evaporated from the undergarments, finally being totally absorbed by the second fabric layer 5 through the first fabric layer 6.

The leather-like textile material of this invention can be used as not only a material for various clothing, including globes and suits, but also a material for chair linings footwears and the others. In addition, although the structure 3 has been described as double-layered, it may be composed of three or more fabric layers and, even in this case, substantially the same effects as that exhibited by the double-layered substrate can be appreciated.

Hereinafter, in order to demonstrate the superiority of the leather-like textile material according to this invention over the prior art products of similar kind, the result of comparison tests will be illustrated.

| Samples | Water Absorption Speed Front to Rear | Rear to Front | Amount of Water Residue on Rear Surface |
|---|---|---|---|
| (A) | 30 min. or more | 72 sec. | 76% |
| (B) | " | 44 sec. | 71% |
| (C) | " | 56 sec. | 74% |
| (D) | 91 sec. | 2 sec. | 50% |
| (E) | 30 min. or more | 30 min. or more | 100% |

-continued

| Samples | Water Absorption Speed Front to Rear | Rear to Front | Amount of Water Residue on Rear Surface |
|---|---|---|---|
| (F) | " | " | " |
| (G) | " | " | " |
| (H) | " | 110 sec. | " |
| (I) | " | 0 to 1 sec. | 27% |

Samples used are as follows:
  (A) Polyvinyl Chloride Leather (Substrate: Spun rayon muslin No. 4 with 30 counts of warp yarns and 30 counts of weft yarns)
  (B) Nylon Leather (Substrate: Twilled cotton fabric No. 9A with 30 counts of warp yarns and 30 counts of weft yarns)
  (C) Polyurethane Leather (Substrate: Same as in Sample (B), but having no gas permeability)
  (D) Polyurethane Leather (Substrate: Raised tricot fabric with cupra and nylon yarns knitted alternately, having a gas permeability).
  (E) Artificial Leather (Substrate: Non-woven polyester fabric)
  (F) Polyurethane Coated Fabric (Substrate: Nylon tricot fabric)
  (G) Coated Fabric commercially sold under the trade name of "Entrant" (Substrate: Nylon taffeta fabric backed up by a foamed polyurethane layer)
  (H) Laminated Fabric commercially sold under the trade name of "Goretex" (Front surface: Nylon Taffeta. Interlining: Foamed polyurethane film)
  (I) Product of Invention (Substrate: Double-layered tricot fabric of polyester (for the second fabric layer) and cupra (for the first fabric layer) coated with polyurethane resin.

Water Absorption Speed is the rate of penetration of a given amount of water through the respective sample from the front surface (on the side of the covering) towards the rear surface (on the side of the substrate) or from the rear surface towards the front surface.

Amount of Water Residue on Rear Surface is the amount of water left on the rear surface when a given amount of water applied to the rear surface has been absorbed in an adsorbent paper and is expressed in terms of percentage relative to the given amount of water.

From the table shown above, it is clear that the textile material according to this invention, represented by Sample (I), is comparable to the prior art materials, except for the one represented by Sample (D), in that no water can substantially penetrate from the front surface, but is superior to any one of the prior art material in respect to the capability of readily absorbing water from the rear surface. This means that, with the textile material according to this invention, the substrate can readily absorb the sweat while keeping a surface portion of the substrate, which may contact the wearer's, to be dry at all times because of the smallest amount of the water residue on the rear surface shown in the table, wherefore the wearer's body can be kept dry while no water is substantially allowed to penetrate through the textile material towards the wearer's body.

What is claimed is:
1. A leather-like textile material essentially consisting of, in combination:
  (a) a multi-layered substrate having first and second fabric layers integrated together, said first fabric layer being made of a fabric material having a high water permeability and a lower water retentivity and said second fabric layer being made of a fabric material having a high water retentivity and a low water permeability; and (b) a layer of synthetic resin having a leather-like appearance coated on the outer side of the second fabric layer while the outer side of the first fabric layer is adapted to be faced to the body of a wearer.

2. The material as claimed in claim 1, wherein each of said first and second fabric layers is a knitted fabric.

3. The material as claimed in claim 1, wherein each of said first and second fabric layer is a woven fabric.

4. The material as claimed in claim 2, wherein the coated layer is made of macroporous polyurethane, and the knitted fabrics for the respective first and second fabric layers are made of polyester and cuprammonium rayon, respectively.

5. The material as claimed in claim 3, wherein the coated layer is made of macroporous polyurethane, and the woven fabrics for the respective first and second fabric layers are made of polyester and cotton, respectively.

6. The material as claimed in claim 1 wherein the multi-layered substrate also has a third fabric layer provided on one side of the first fabric layer opposite to the second fabric layer.

7. The material as claimed in claim 6, wherein the coated layer is made of macroporous polyurethane, the first fabric layer is made of cuprammonium rayon, the second fabric layer is made of polyester and the third layer is made of polyester.

8. The material as claimed in claim 7, wherein said third fabric layer is a knitted fabric.

9. The material as claimed in claim 7, wherein said third fabric layer is a woven fabric.

* * * * *